United States Patent
Bertrand, Jr. et al.

(10) Patent No.: US 6,755,029 B2
(45) Date of Patent: Jun. 29, 2004

(54) AMMONIA SEPARATOR AND NEUTRALIZER

(76) Inventors: Marvin Ralph Bertrand, Jr., 6517 Hollow Tree, Louisville, KY (US) 40228; James A. Masterson, 8109 Pine Castle Dr., Louisville, KY (US) 40219

(*) Notice: Subject to any disclaimer, the term of this patent is extended or adjusted under 35 U.S.C. 154(b) by 0 days.

(21) Appl. No.: 10/338,504

(22) Filed: Jan. 8, 2003

(65) Prior Publication Data

US 2003/0126868 A1 Jul. 10, 2003

Related U.S. Application Data

(60) Provisional application No. 60/346,549, filed on Jan. 8, 2002.

(51) Int. Cl.$^7$ ............................ F25B 43/02; F25B 43/04
(52) U.S. Cl. ................................ 62/84; 62/475; 62/195
(58) Field of Search .......................... 62/84, 475, 195, 62/192, 193, 468, 470, 471

(56) References Cited

U.S. PATENT DOCUMENTS

| | | |
|---|---|---|
| 1,836,318 A | 12/1931 | Gay |
| 3,304,697 A | 2/1967 | Ramsey |
| 3,304,741 A | 2/1967 | Weller |
| 3,438,218 A | 4/1969 | O'Neil |
| 3,540,189 A | 11/1970 | Siewers et al. |
| 4,187,695 A | 2/1980 | Schumacher |
| 4,280,337 A | 7/1981 | Kemp |
| 4,410,503 A | 10/1983 | van Nassau et al. |
| 4,456,535 A | 6/1984 | Zuidam et al. |
| 4,559,210 A | 12/1985 | Diemer et al. |
| 4,594,131 A | 6/1986 | Maier |
| 4,689,156 A | 8/1987 | Zibrida |
| 5,001,908 A | 3/1991 | Mayer |
| 5,086,621 A | 2/1992 | Starner et al. |
| 5,165,248 A | 11/1992 | Sishtla |
| 5,182,919 A | 2/1993 | Fujiwara |
| 5,321,956 A | 6/1994 | Kemp et al. |
| 5,407,655 A | 4/1995 | Sarritzu |

OTHER PUBLICATIONS

IIAR (International Institute of Ammonia Refrigeration); Good Practices for the Operation of an Ammonia Refrigeration System; Bulletin No. R1 1983; all pages; Arlington, VA, USA.

IIAR (International Institute of Ammonia Refrigeration); "Oil Draining Guidelines"; Guidelines—Aug. 1996; all pages; Arlington, VA, USA.

*Primary Examiner*—Chen Wen Jiang
(74) *Attorney, Agent, or Firm*—Waters Law Office; Robert R. Waters

(57) ABSTRACT

The present invention is a method and apparatus to provide for the safe and effective removal and neutralization of ammonia from a stream of waste oil or other liquid. The apparatus consists of a receiving tank, a treatment tank, transfer piping, associated controls, pumping and monitoring mechanisms. The primary utility for the invention is with commercial and industrial refrigeration units. The mixture of waste oil and entrained ammonia is removed from the drain port of the refrigeration system and placed into the receiving tank. The receiving tank includes aeration piping and nozzles and is in fluid communication with the treatment tank. The system provides for the introduction of an acid such as carbon dioxide as a neutralizing agent to be mixed with liberated ammonia as it is pumped into the treatment tank for recirculation.

16 Claims, 2 Drawing Sheets

AMMONIA SEPARATOR AND NEUTRALIZER

CROSS REFERENCE TO RELATED APPLICATIONS

This application claims priority from U.S. provisional application 60/346,549, filed on Jan. 8, 2002. This application relates to an apparatus which isolates ammonia from a waste oil mixture and provides for the ammonia to be neutralized. The entire disclosure contained in U.S. provisional application 60/346,549, including the attachments thereto, is incorporated herein by reference.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

Ammonia ($NH_3$) is a commonly used chemical prevalent in many industrial processes throughout the world. Ammonia may also be naturally occurring and is familiar to most of us as a mild irritant in small doses. In large concentrations, ammonia can be quite hazardous and, accordingly, ventilation and other safety precautions must be undertaken when working near ammonia. At normal temperatures and pressures, ammonia is a colorless gas made up of one part nitrogen to three parts hydrogen. Ammonia is lighter than air and has a sharp, pungent odor that serves as a warning of its presence. Although ammonia is a toxic gas, it is not a cumulative poison. Accordingly, removal from the source serves as the best protection. Ammonia is highly soluble in water and forms a solution known as ammonium hydroxide ($NH_4OH$) or aqua ammonia which is commonly used as a household cleanser.

One industrial application that has historically made liberal use of ammonia is commercial and industrial refrigeration systems. For such a refrigeration system, anhydrous ammonia is typically used. Anhydrous ammonia is the liquid form of pure ammonia gas, and is technically water-free. Most refrigeration experts consider industrial grade anhydrous ammonia to be the most economical and efficient heat transfer medium for industrial refrigeration processes.

In an industrial refrigeration system, compressors, piping, and vessels containing anhydrous ammonia are generally prevalent throughout the plant. Such a refrigeration system will generally also feature lubricating oils which are inserted into the compressor to keep the compressor lubricated. Invariably, some of the oil or other lubricant will migrate throughout the system, mixing with the anhydrous ammonia to coat the piping system. Since the oil will serve as an insulator or retardant to heat transfer, a high prevalence of waste oil in a refrigeration system will compromise efficiency of the refrigeration process. In order to prevent deterioration of the refrigeration function, accumulations of waste lubricating oil will need to be purged from the system. Most commercial and industrial refrigeration units will include one or more ports located at a lower level in the piping system and arranged such that lubricating oil will accumulate there to be drained from the pipes for collection and/or discarding.

In the United States, the International Institute of Ammonia Refrigeration (IIAR) is generally recognized as the leading authority on issues related to the operation and maintenance of industrial refrigeration systems utilizing ammonia. The IIAR has set forth various publications detailing proper practices for the operation of ammonia refrigeration systems as well as safety guidelines. Among the most pertinent guides set forth, Bulletin No. R1 (1983) provides a comprehensive analysis of the use of anhydrous ammonia in a refrigeration system. The IIAR has also set forth specific oil draining guidelines which are to be used in removing waste oil from an ammonia refrigeration system. (See the August 1996 IIAR Oil Draining Guidelines.) The guidelines note that draining oil from an ammonia refrigeration system is a potentially dangerous process and should only be performed by properly trained personnel.

In order to remove used lubricating oil from an industrial refrigeration unit, the typical procedure employed is for an employee to use the refrigeration system pressure if it is positive, or otherwise raise the pressure to a positive value above atmospheric pressure. An OSHA-approved ammonia hose should be screwed into the oil drain valve port. Preferably, the drain line should also include a sight flow indicator such as, for example, Model 700 manufactured by Anderson Midwest. Such an indicator will enable the employee performing the oil removal to know when all the oil is removed and liquid ammonia is passing the sight glass. At that point, the employee will quickly close the valve when it is discovered that all the oil has been drained.

A bucket is placed under the oil drain valve port before the valved is opened, and the oil will flow into the bucket for disposal. In the alternative, hand pumps or mechanical pumps may also be used. Even when a pump is used, the waste oil is still typically removed into a bucket or other open container for removal by an employee. Since the waste oil has been in contact with ammonia, invariably the waste material removed will be a mixture of oil with entrained ammonia.

Under the IIAR guidelines, recognition of the inherent safety risks of removal of the oil-ammonia mix requires that an employee proceed with goggles, gloves and face shield before opening the valve port. In addition, the personnel in charge should check the ventilation fan in the area where the oil is being drained and only perform oil removal when appropriate ventilation is available. As the mixture is released, ammonia will be noticed in the ambient air along with the undesirable environmental effects. The maintenance personnel should always be in a position on the up-draft side of the oil drain bucket for this reason. The IIAR guidelines also state that the personnel should remain in position at the oil pot and keep a vigilant watch during the draining process until such time as the valve has been properly repositioned. Of course, for the personnel involved, the foul smell of ammonia will be prevalent. Since many waste removal ports are located within proximity to other industrial systems or personnel stations, oil draining is sometimes not performed as regularly as it should be. Of course, this leads to the inevitable compromising of the refrigeration system efficiency.

What is needed in the art is a means by which the waste oil can be effectively separated from the ammonia and the ammonia neutralized such as to prevent the undesirable side effects associated with draining waste oil from a commercial refrigeration unit that utilizes ammonia.

2. Description of the Related Art

Since ammonia-based refrigeration systems are old in the art, patents related to the composition of such a system are long expired. Many old patents also disclose systems or mechanisms for removing lubricating oil from a refrigeration system. One of the older patents which is also typical of standard commercial refrigeration oil separation can be found in U.S. Pat. No. 1,836,318 by N. H. Gay. In that refrigeration system, the oil separator noted by numeral 26 in FIG. 1 is typical. Other patents of note include U.S. Pat. Nos. 3,304,697 by Ramsey wherein a centrifugal separator is disclosed for separating the gaseous and non-gaseous components of a fluid stream including a collection pump and dividing means. U.S. Pat. No. 3,304,741 by Weller also discloses an oil separation system for a refrigeration system wherein an oil separator is positioned at a lower level with respect to a refrigeration system, and comprises an oil sump for gravity flow of oil into the compartment. U.S. Pat. No. 3,438,218 by O'Neil features a standard oil separation system wherein separated oil may be returned to the system.

U.S. Pat. No. 5,407,355 by Sarritzu claims a process of recovery of ammonia from a liquid waste stream. The process consists of reacting the stream with pure carbon dioxide or a gaseous mixture rich in carbon dioxide and then reacting the resulting mix with calcium chloride such as to cause calcium carbonate to undergo thermal decomposition. The thermal decomposition step is carried out preferably not lower than 850° C. Accordingly, the system has little utility for use in connection with a commercial refrigeration system.

U.S. Pat. No. 5,001,908 by Mayer discloses an oil separator for a refrigeration system wherein oil is separated from vaporized refrigerant leaving the high pressure discharge side of the compressor. Mayer states that in the preferred embodiment, oil is removed from the incoming refrigerant vapor in two successive stages, a centrifugal stage and a coalescing filter stage. While novel in many respects, this system does not address how to deal with entrained ammonia prevalent in a waste lubricating oil in a refrigeration system.

The prior art also features an assortment of patents directed to oil recovery systems for centrifugal refrigeration equipment or chillers including U.S. Pat. No. 5,165,248 by Sishtla and U.S. Pat. No. 5,182,919 by Fujiwara.

Perhaps the closest prior art system found is U.S. Pat. No. 4,280,337 by Kemp. Kemp discloses a means for separating oil from an ammonia-based refrigerant for potential reuse. The Kemp system includes an improved oil separation tank having upper and lower zones connected to the bottom of a surge means. A first conduit is included for draining settled out oil from the bottom of the surge means into the oil separation tank while a second conduit conducts oil from the lower zone of the oil separation tank to the suction intake of the compressor. This is best illustrated in FIG. 1 of the patent. However, Kemp is directed essentially to oil recovery and does not address the problem of neutralizing ammonia for improved safety in the oil separation process.

U.S. Pat. No. 4,559,210 by Diemer et al. is a multi-stage washing operation for the removal of ammonia from a gas stream. The method includes the steps of washing out ammonia from gas with a liquid enriched with ammonia in an ammonia washer followed with a washing with ammonia-free water at a second wash stage. A partial stream of waste water is then divided from the remainder and the partial stream is treated by an addition of sulphuric acid before being reintroduced into the final wash stage.

U.S. Pat. No. 4,689,156 to Zibrida involves removing ammonia from waste water by treating the waste water with an alkaline reagent consisting of lime and caustics sufficient to raise the pH to a value of at least 12.4. At that point, the waste water is subjected to a gas stripping exercise, said stripping being controlled to maintain the free ammonia equivalents of the waste water to at least 12.4 and acidifying the stripped waste water to lower the unionized ammonia content to less than 0.05 ppm $NH_3(N)$.

The prior art also includes a number of patents directed to processes for removing ammonia from a waste stream that are tangentially relevant to the present invention. For example, U.S. Pat. No. 3,540,189 by Siewers et al. is directed to a process for removing ammonia which has been formed during the de-gasification of coal in a coke oven in order to prevent the gas pipes from becoming corroded and in order to avoid formation of oxides in the smoke. U.S. Pat. No. 4,410,503 by van Nassau et al. involves a process for removing urea, ammonia and carbon dioxide from an aqueous solution. The method involves feeding a urea containing process condensate, relatively poor in ammonia, into an upper portion of a reaction chamber where it is heated by means of steam fed into the bottom of the column. The temperature and pressure in the column is maintained such that urea is decomposed therein into ammonia and carbon dioxide. The steam serves not only as a heating agent, but also as a stripping agent.

U.S. Pat. No. 4,456,535 by Zuidam et al. is a process for removing urea, ammonia and carbon dioxide from an aqueous solution by hydrolysis of urea and desorption of the ammonia and carbon dioxide. The solution is passed into the top portion of a column at a pressure of between 10 and 30 bar and is caused to flow downward countercurrent to an upward gas stream. The patent states that the top of the reaction column should be maintained at a temperature of between 170° and 220° C. and the bottom of the column should be maintained at a temperature of between 180° and 230° C.

In general, a review of pre-existing methods and technology finds considerable prior art directed to both the creation and elimination of ammonia in specific circumstances. The prior art also shows numerous uses and arrangements of ammonia-based refrigeration systems. However, none of the prior art is directed to the issue of neutralizing entrained ammonia in a stream of waste lubricating oil leaving a commercial refrigeration system such as to eliminate the attendant safety risks associated with the task.

SUMMARY OF THE INVENTION

The present invention is a method and apparatus for isolating ammonia from an oil mixture and providing for the ammonia to be neutralized. The apparatus includes a receiving tank, a treatment tank, a transfer line placing the receiving tank in fluid communication with the treatment tank, and a recirculating system associated with the treatment tank. The receiving tank is a closed rigid structure for receiving an ammonia-entrained oil supply from the refrigeration system. The transfer pipeline is oriented between the receiving tank and treatment tank. After the mixture in the receiving tank is heated to a temperature required to evaporate the entrained ammonia from the oil supply, the released gaseous ammonia rises in the receiving tank and travels through the transfer pipeline into a treatment tank. The treatment tank holds an aqueous media and the system provides for the controlled introduction of an acid into either the treatment tank or the transfer piping for treatment and neutralization of the mixture. The apparatus further includes a means for pumping the resultant mixture of the aqueous media, acid and released ammonia from the treatment tank, circulating said mixture through a closed system of recirculation piping for return to the treatment tank.

A primary objective of this invention is to provide a method and apparatus for effectively and efficiently removing entrained ammonia from the waste lubricating oil from a commercial refrigeration system.

Another objective of the present invention is to set forth an apparatus and method for neutralizing liberated ammonia from waste oil that is safer than prior art methods and more sensitive to the environmental constraints of the ambient plant.

Another objective of the present invention is to provide for an ammonia removal and neutralization system that is economical to operate and build. Furthermore, another objective of the present invention is to provide an apparatus which may be oriented on a portable frame for easy introduction where needed in the refrigeration system and for ease in relocation upon completion of the task.

As discussed above, the method and device of the present invention overcomes the disadvantages inherent in prior art methods and devices. In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also it is to be understood that the phraseology and terminology employed herein are for the purposes of description and should not be regarded as limiting.

Accordingly, those skilled in the art will appreciate that the conception upon which this invention is based may readily be utilized as the basis for other structures, methods and systems for carrying out the purposes of the present invention. It is important, therefore, that the claims be regarded as including such equivalent constructions insofar as they do not depart from the spirit of the present invention.

Furthermore, the purpose of the foregoing Abstract is to enable the U.S. Patent and Trademark Office and the public generally, and especially including the practitioners in the art who are not familiar with patent or legal terms or phraseology, to determine quickly from a cursory inspection, the nature and essence of the technical disclosure of the application. The Abstract is neither intended to define the invention of the application nor is it intended to be limiting to the scope of the invention in any way.

BRIEF DESCRIPTION OF THE DRAWINGS

Additional utility and features of this invention will become more fully apparent to those skilled in the art by reference to the following drawings, wherein all components are designated by like numerals and described more specifically.

DETAILED DESCRIPTION OF THE PREFERRED EMBODIMENT

Figure 1:
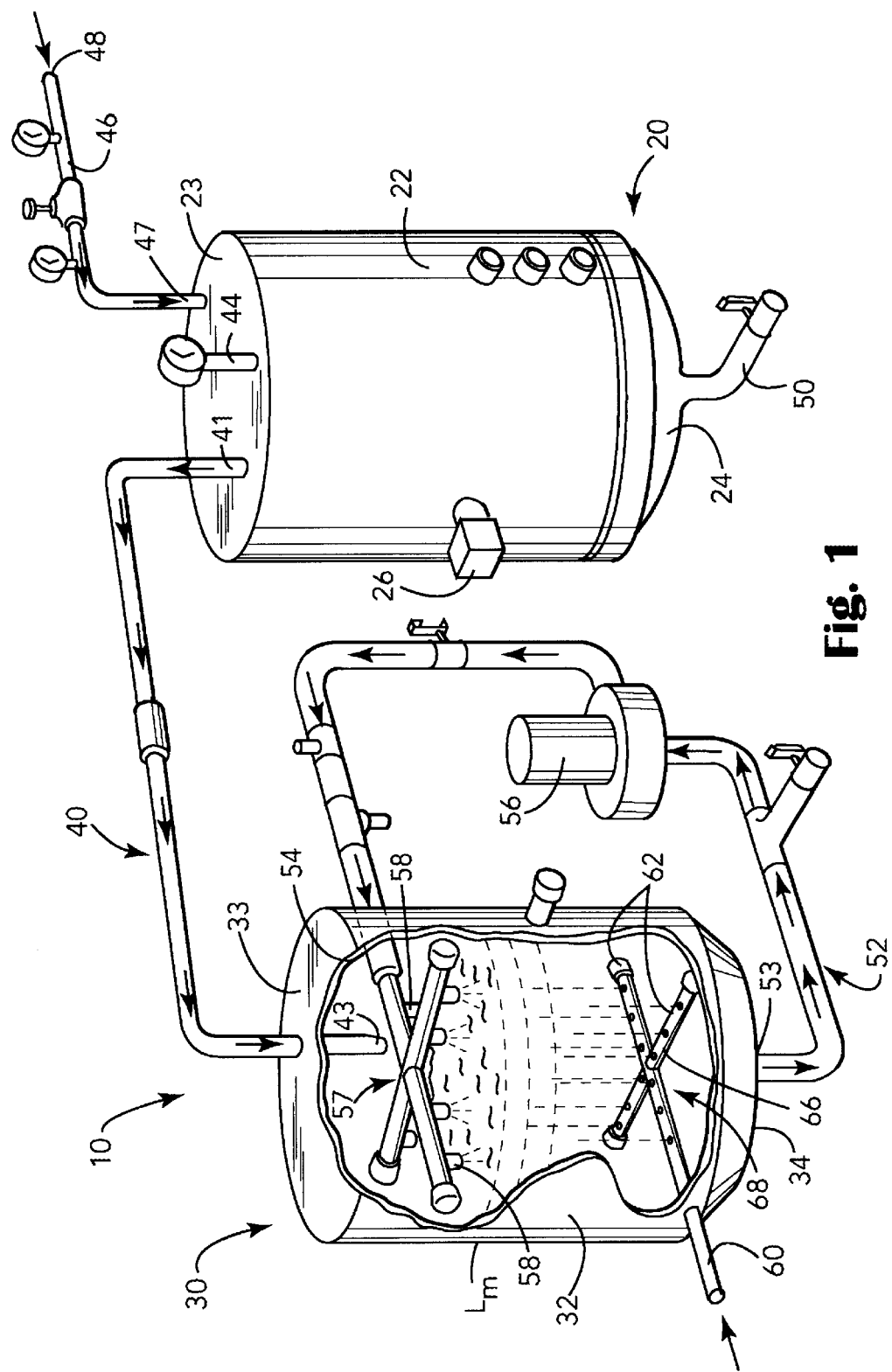
FIG. 1 is a perspective view of a first embodiment apparatus of the present invention with a cutaway view of the treatment tank.

The present invention is for a method of safely isolating waste ammonia from an oil/ammonia waste mix such as that encountered in a commercial and industrial refrigeration system. Referring to FIG. 1, the apparatus includes a receiving tank 20, having a body 22 defining a top 23 and a base 24, and a treatment tank 30. The receiving tank 20 and the treatment tank 30 are interconnected by a transfer line 40.

As used in this patent, the term "oil" is meant to include and embrace any and all petro-chemical compounds or components which may be used for lubrication purposes. Although, the preferred embodiment described herein details the removal of entrained ammonia from compressor lubricating oil it is to be understood and appreciated that other types of lubricants may also be treated in the same respect.

Extending into the receiving tank top 23 are a monitoring gauge 44, a first end 47 of a feeder line 46 and a first end 41 of the transfer line 40. The feeder line 46 extends away from the receiving tank 20 and includes a second end 48 which can be attached to an external source for receiving ammonia and ammonia-tainted oil. The feeder line 46 optionally may include gauges, valves, regulators or other control devices, as necessary. The transfer line 40 extends from the top 23 of the receiving tank 20 laterally to the treatment tank 30. Transfer line 40 should preferably be oriented at a level higher than the top of the treatment tank 30 such that in the event of an overflow of the treatment tank 30, no backflow into transfer line 40 would be possible. The transfer line 40 may optionally include a check valve or similar control devices. A drain line 50 is affixed to the base 24. The body 22 includes a heat source 26 and, optionally, may include a float switch, sight glasses or additional gauges.

The apparatus can be used in a method to treat ammonia-tainted oil or to purge ammonia from the system in order to make repairs. The ammonia-tainted oil is fed into the receiving tank 20 from an external source through the feeder line 46. The receiving tank 20 and the oil is heated, thereby driving the volatile components of the oil mixture through the transfer line 40 and into the treatment tank 30. The treatment tank 30 has a body 32, defining a top 33 and a base 34, and includes a recirculating line 52. The recirculating line 52 includes a first end 53 affixed to the base 34 of the tank and a second end 54 affixed to the body 32 of the tank near the top 33. The recirculating line 52 includes an in-line pump 56 to force liquid material from the base 34 of the tank through the line 52 and back into the treatment tank body 32. Optionally, the recirculating line 52 may include gauges, valves, regulators or other control devices, as necessary. The second end 54 of the recirculating line 52 is in fluid communication with a spray arm 57, mounted within the treatment tank body near the tank top. The spray arm includes a plurality of nozzles 58 which can feed the liquid material back into the tank body and must be mounted above the anticipated maximum liquid height level, Lm for the tank 30. A second end 43 of the transfer line 40 protrudes through the treatment tank top 33 and extends partially into the treatment tank body 32, thereby placing the treatment tank 30 in fluid communication with the receiving tank 20. The transfer line 40 extends far enough into the tank 30 that the second end 43 is positioned between the spray arm nozzles 58 and the base 34 and below the maximum anticipated liquid height level, Lm. The treatment tank 30 also includes a gas feeder 64 mounted within the body 32 near the base 34 of the tank 30. The gas feeder 60 has at least one, and preferably about four, arms 62. Each arm 62 includes a plurality of apertures 66 thereby allowing gas to exit the arms 62 and flow into the tank body 32. One end of gas feeder 60 protrudes through the body 32 and is attached to an external gas source.

The treatment tank 30 is initially filled with heated aqueous media, preferably at a level such that the second end 43 of the transfer line 40 is submerged, such that the volatile materials are fed into the aqueous media in the treatment tank 30. Gas, preferably carbon dioxide that is heated and has a regulated flow rate, is fed from an external source through gas feeder 60 and into the treatment tank 30 - and more specifically, into the aqueous solution—through apertures 66 on arms of the gas feeder 60. As the gas is fed into the treatment tank 30, the aqueous solution is agitated by exiting the treatment tank through the first end 53 of the recirculating line 52, then passing through the second end 54 into the spray arm 57. The aqueous solution feeds through the nozzles 58 and sprays into the treatment tank 30. A pump 56 forces the aqueous solution through the recirculating line 52. At predetermined time intervals, acid aliquots may be added to the aqueous solution to gradually drop the pH until the solution is neutralized. The acid may be added manually or through an automated feeder. The neutralized solution can then be purged from the treatment tank through a discharge port (not shown).

From a reading of the above, one with ordinary skill in the art should be able to devise variations to the inventive features. For example, various gauges, control valves, and similar known devices may be added to the invention to automate parts of the system, or to allow for better monitoring of the system. These and other such variations fall within the spirit and scope of the present invention.

Figure 2:
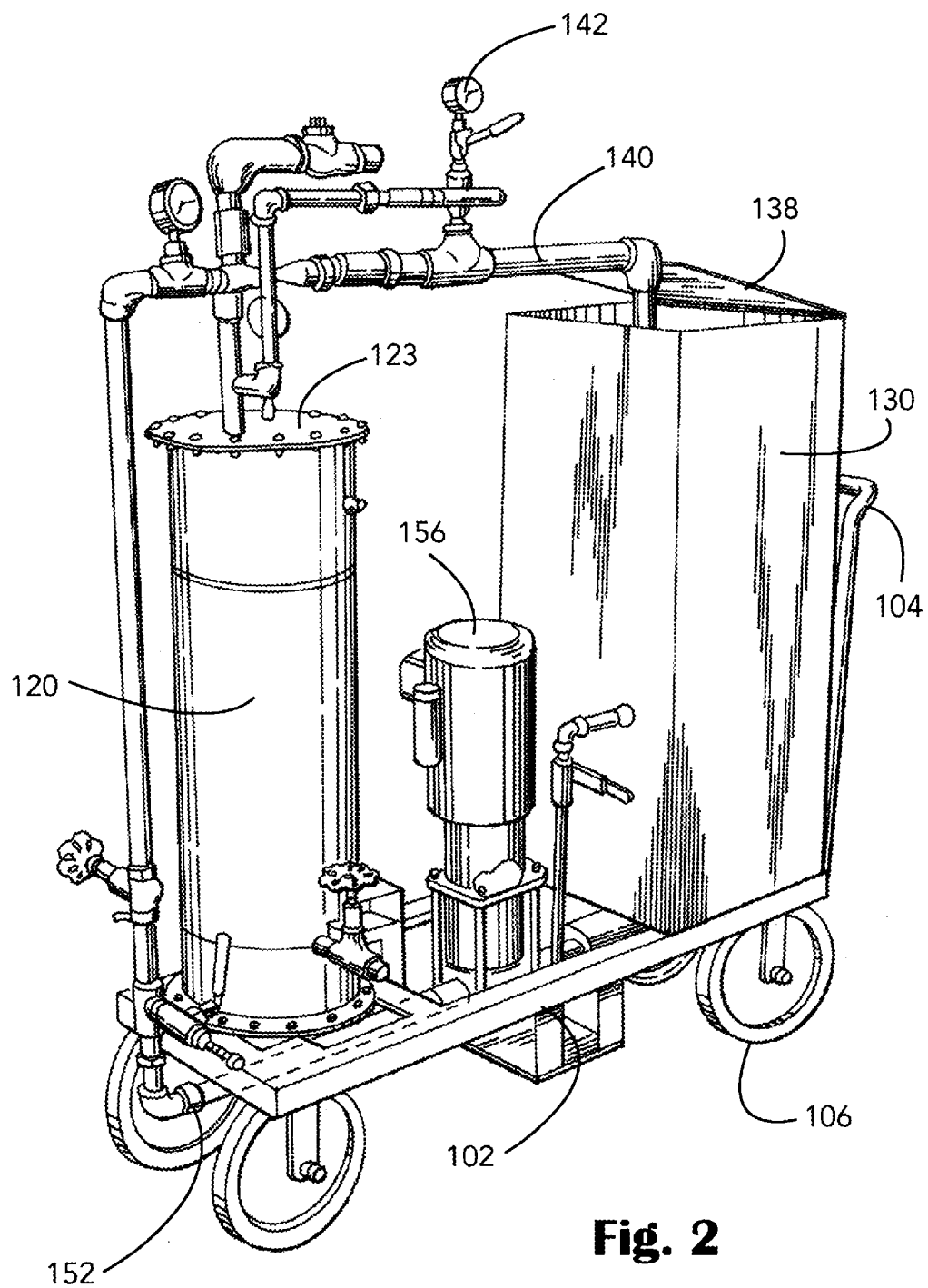
FIG. 2 is a perspective view of a second embodiment of the present invention showing the ammonia separator and neutralizer arranged as a portable unit on a wheeled frame.

FIG. 2 shows an alternative embodiment of the present invention wherein the ammonia separator and neutralizer is disposed upon a wheeled frame in order to make the unit portable. As shown in the drawing, a horizontal frame 102 supports the receiving tank 120 and treatment tank 130 and associated equipment. The frame 102 is optimally constructed of heavy gauge steel although other materials may also be used. Considering the fact that the frame may be called upon to support considerable weight at times, the frame 102 should be durable enough to withstand weight pressures of at least 500 pounds. In this preferred embodiment, the unit includes a handle 104 which rises vertically from frame 102 at one end of the frame. Handle 104 is likewise constructed of steel or a suitable equivalent. FIG. 2 shows the handle arranged as a pull bar which is optimal although other handle mechanisms may be employed.

Frame 102 is supported by four wheels 106 as shown in FIG. 2. The wheels may be any suitable commercially available wheel. As shown in FIG. 2, a 6 inch diameter wheel is optimal for this use. In order to navigate the portable unit more easily, it is preferable that two of the wheels 106 be caster-type wheels such that they may be moved in any direction with ease. Preferably, the two wheels oriented closest to handle 104 should be caster-type wheels while the two wheels 106 at the opposite end of the frame 102 are permanently oriented in the direction of the frame rather than caster-type wheels.

As further shown in FIG. 2, frame 102 provides support for receiving tank 120 and treatment tank 130. Receiving tank 120 is preferably constructed of steel and is shown to be round in FIG. 2 while the treatment tank 130 is square. These shapes are optional and the arrangement of shapes shown in FIG. 2 is only employed to create a unit in which the shapes of the two primary tanks are different in order to alert the operator as to which tank is which. It is to be appreciated that other shapes and sizes of the two primary tanks may be utilized. Receiving tank 120 includes a flat top 123 which is suitably anchored by permanent bolts. The receiving tank 120 and treatment tank 130 are interconnected by a transfer line 140.

Treatment tank 130 is characterized by a recirculating line 152 which includes an inline pump 156 to force liquid material from the base of treatment tank 130 through line 152 to be reintroduced into treatment tank 130. Optimally, the recirculating line 152 may include gauges, valves, regulators or other control devices as necessary. Preferably, pump 156 may be isolated by the use of valves for pump maintenance or removal. The second end of the recirculating line 152 is fluid communication with a spray arm mounted within the treatment tank near the top of the tank. (The spray arm and interior elements of the system are not shown in FIG. 2.)

Functionally, the portable unit performs the same separation and neutralization functions as the stationary unit described in FIG. 1. The primary additional utility for the portable configuration is the ease of moving the apparatus into place and removing it upon completion. In addition, a plant with multiple refrigeration lines could benefit from an apparatus that can be moved from line to line when maintenance is required.

Another embodiment which may be employed is to orient the receiving tank 120 and treatment tank 130 in a stacked configuration on the wheeled frame 102. In such a construction, the receiving tank 120 an treatment tank 130 will be in close physical relationship to each other, and accordingly, the contents of the treatment tank will be heated, in part, by heat transfer from the treatment tank below. The associated piping and other equipment would be essentially unchanged in this configuration.

We claim:

1. An apparatus for separating and neutralizing entrained ammonia from an oil stream being removed from a refrigeration system comprised of:

a closed receiving tank for receiving an ammonia-entrained oil supply from said refrigeration system;

a transfer pipeline having a first end and second end with said first end of said transfer pipeline being oriented in the top of said receiving tank and in fluid communication therewith;

a treatment tank for holding an aqueous media with said second end of said transfer pipeline being oriented inside said treatment tank and terminating at a level at or above the top surface of said aqueous media;

means for controllably introducing an acid into said treatment tank or into said transfer pipeline such as to introduce the acid into said treatment tank;

means for pumping said mixture of said aqueous media, acid and released ammonia from said treatment tank and circulating said mixture through a closed system of recirculation piping consisting of a first end and a second end, both of which terminate in said treatment tank.

2. The apparatus of claim 1 wherein said first end of said recirculation piping terminates in the bottom of said treatment tank and wherein said second end of said recirculation piping terminates in one or more spray arms comprising one or more spray nozzles in the top of said treatment tank oriented to spray the recirculated mixture inside the top of said treatment tank at a level above said aqueous media.

3. The apparatus of claim 1 wherein said receiving tank further includes a means for heating the contents of said receiving tank.

4. The apparatus of claim 1 wherein said apparatus is constructed as a portable apparatus disposed upon a wheeled frame.

5. The apparatus of claim 4 wherein said receiving tank and treatment tank are oriented in a stacked configuration on said wheeled frame.

6. The apparatus of claim 1 wherein said acid is carbon dioxide.

7. The apparatus of claim 1 wherein said acid is muriatic acid.

8. The apparatus of claim 1 wherein said aqueous media is comprised of water.

9. A method of separating and neutralizing entrained ammonia from an oil stream being removed from a refrigeration system, comprising the steps of:
   a) removing the ammonia-entrained oil supply from said refrigeration system and placing said ammonia-entrained oil supply into a receiving tank;
   b) heating said receiving tank to above a temperature required to evaporate the entrained ammonia from said oil supply, whereupon said released gaseous ammonia rises and enters a first end of a transfer pipeline extending from the top of said receiving tank and travels through said transfer pipeline into a treatment tank;
   c) mixing said released gaseous ammonia with an aqueous media in said treatment tank by orienting the second end of said transfer pipeline at or above the level of said aqueous media in said treatment tank;
   d) placing an acid into said aqueous media; and
   e) pumping the mixture of said aqueous media, acid and released ammonia from said treatment tank, circulating said mixture through a closed system of piping for return to said treatment tank.

10. The method of claim 9 wherein said first end of said recirculation piping terminates in the bottom of said treatment tank and wherein said second end of said recirculation piping terminates in one or more spray arms comprising one or more spray nozzles in the top of said treatment tank oriented to spray the recirculated mixture inside the top of said treatment tank at a level above said aqueous media.

11. The method of claim 9 wherein said receiving tank further includes a means for heating the contents of said receiving tank.

12. The method of claim 9 wherein said receiving tank, treatment tank, transfer piping, recirculating piping and all associated equipment are disposed upon a wheeled frame.

13. The method of claim 12 wherein said receiving tank and treatment tank are oriented in a stacked configuration on said wheeled frame.

14. The method of claim 9 wherein said acid is carbon dioxide.

15. The method of claim 9 wherein said acid is muriatic acid.

16. The method of claim 9 wherein said aqueous media is comprised of water.

* * * * *